United States Patent
Yoo et al.

(10) Patent No.: US 9,756,040 B2
(45) Date of Patent: Sep. 5, 2017

(54) USER AUTHENTICATION METHOD WITH ENHANCED SECURITY

(71) Applicant: SSenStone Inc., Seoul (KR)

(72) Inventors: Chang Hun Yoo, Seoul (KR); Min Gyu Kim, Seoul (KR); Un Yeong Heo, Anyang-si (KR); Ga Hye Kim, Seoul (KR)

(73) Assignee: SSenSton Inc., Seoul (KR)

( * ) Notice: Subject to any disclaimer, the term of this patent is extended or adjusted under 35 U.S.C. 154(b) by 0 days.

(21) Appl. No.: 15/396,797

(22) Filed: Jan. 2, 2017

(65) Prior Publication Data

US 2017/0195320 A1    Jul. 6, 2017

(30) Foreign Application Priority Data

Jan. 6, 2016 (KR) ........................ 10-2016-0001584

(51) Int. Cl.
*H04L 9/32* (2006.01)
*H04L 29/06* (2006.01)
(Continued)

(52) U.S. Cl.
CPC ........ *H04L 63/0838* (2013.01); *H04L 9/0861* (2013.01); *H04L 9/14* (2013.01);
(Continued)

(58) Field of Classification Search
None
See application file for complete search history.

(56) References Cited

U.S. PATENT DOCUMENTS

| | | |
|---|---|---|
| 2006/0136739 A1 | 6/2006 | Brock et al. |
| 2009/0185687 A1 | 7/2009 | Wankmueller et al. |

(Continued)

FOREIGN PATENT DOCUMENTS

| | | |
|---|---|---|
| JP | 2003208408 B | 7/2003 |
| JP | 2015-226133 A | 12/2015 |

(Continued)

OTHER PUBLICATIONS

Korean Office Action for corresponding Korean Patent Application No. 10-2016-0001584 dated Feb. 19, 2016.
(Continued)

*Primary Examiner* — Brandon Hoffman
(74) *Attorney, Agent, or Firm* — Hauptman Ham, LLP (57) ABSTRACT

A user authentication method with enhanced security is provided. The method includes generating a first common authentication key if a user of the user terminal enters a private password and providing the generated first common authentication key to an authentication server, registering the first common authentication key and user information by matching the first common authentication key with the user information, generating a second common authentication key in real time if the user enters the private password, generating a server authentication key, generating first server authentication information by calculating a one time password (OTP) by using the server authentication key as an operation key, generating a user authentication key, generating first user authentication information by calculating an OTP by using the user authentication key as an operation key, and performing user authentication based on whether the first server authentication is identical to the first user authentication.

14 Claims, 4 Drawing Sheets

(51) Int. Cl.
   *H04W 12/04* (2009.01)
   *H04W 12/06* (2009.01)
   *H04L 9/08* (2006.01)
   *H04L 9/14* (2006.01)

(52) U.S. Cl.
   CPC ........ *H04L 63/067* (2013.01); *H04L 63/0823* (2013.01); *H04W 12/04* (2013.01); *H04W 12/06* (2013.01)

(56) References Cited

U.S. PATENT DOCUMENTS

| | | |
|---|---|---|
| 2010/0180328 A1 | 7/2010 | Moas et al. |
| 2014/0120905 A1 | 5/2014 | Kim |
| 2014/0189359 A1* | 7/2014 | Marien ................ H04L 9/3234 713/172 |
| 2015/0381621 A1 | 12/2015 | Innes et al. |

FOREIGN PATENT DOCUMENTS

| | | |
|---|---|---|
| KR | 10-1997-0031533 A | 6/1997 |
| KR | 10-2009-0036057 A | 4/2009 |
| KR | 10-1172234 B1 | 8/2012 |
| KR | 10-2013-0026171 A | 3/2013 |
| KR | 10-1270941 B1 | 6/2013 |
| KR | 10-2014-0043071 A | 4/2014 |
| KR | 10-1558557 B1 | 10/2015 |

OTHER PUBLICATIONS

Korean Notice of Allowance for corresponding Korean Patent Application No. 10-2016-0001584 dated Mar. 28, 2016.
European Search Report dated Apr. 12, 2017 corresponding to European Patent Application No. EP16207510.
Japanese Notice of Allowance dated Feb. 28, 2017 corresponding to Japanese Patent Application No. JP 2016-254943.

\* cited by examiner

USER AUTHENTICATION METHOD WITH ENHANCED SECURITY

CROSS-REFERENCE TO RELATED APPLICATIONS

A claim for priority under 35 U.S.C. §119 is made to Korean Patent Application No. 10-2016-0001584 filed Jan. 6, 2016, in the Korean Intellectual Property Office, the entire contents of which are hereby incorporated by reference.

BACKGROUND

Embodiments of the inventive concept described herein relate to a user authentication method with enhanced security, and more particularly, relate to a user authentication method, in which it is unnecessary to manage a password of a user in view of a certificate authority, for easily replacing the password in view of the user, determining whether an authentication site is true, and enhancing security through multi-authentication.

It has become common for financial transactions or a variety of business necessary for user authentication to be conducted through online environments in modern society rather than face-to-face contact. User authentication online needs a more cautious approach rather than face-to-face contact. In most cases, it is requested to install various security programs including an ActiveX program and a keyboard security program or control programs in a user terminal. It is prepared for an outflow of information by enhancing security through security devices such as certificates, security cards, and one time password (OTP) devices.

An OTP device which is one of representative user authentication methods and has an embedded unique key is provided to a user in advance. If the user accesses an electronic banking network and requests an authentication server (a server of a financial institution) to perform authentication, the OTP device generates an OTP number based on a random number associated with a current time by using the unique as an operation key. The user manually enters the generated OTP number as a password and sends the OTP number to the authentication server. The authentication server authenticates that the user is a true user using the OTP number.

However, if the user transacts with a plurality of financial institutions, since he or she has an OTP device provided for each financial institution, he or she should separately purchase an OTP device for each financial institution and should have a plurality of OTP devices. The user should find an authentication device for specific financial institution one by one among the plurality of OTP devices.

Further, since the user may optionally replace a unique key of an OTP device, if he or she loses the OTP device, he or she should directly visit a financial institution and should be issued a new OTP device. It takes enormous expense and time for financial institutions to issue OTP devices again to all clients if unique keys of OTP devices of the clients flow out.

Meanwhile, if the user is authenticated or logs in to a related server through a specified password, the related server should register, store, and manage the password of the user and the user should recognize the password. Since the related server requests the user to change the password on a regular basis to prepare for an outflow, it is inconvenient to manage the password.

In addition, with the development of hacking technologies, an outflow of information, such as screen capturing, a shoulder surfing attack, screen hacking technologies such as screen monitoring, or an outflow of certificates or passwords due to spywares installed in personal computers (PCs), is performed in various manners. Since a professional hacker may decrypt an encrypted password by some degrees of efforts, it is necessary to seek convenience and enhance security in a procedure for user authentication.

PRIOR ART DOCUMENT

Korean Patent No. 10-1270941 (issue date May 29, 2013)

SUMMARY

Embodiments of the inventive concept provide a user authentication method with enhanced security for overcoming the above-mentioned problems.

Embodiments of the inventive concept provide a user authentication method for having a simple user authentication procedure and enhancing security.

Embodiments of the inventive concept provide a user authentication method for a user to determine whether a certificate authority, an authentication server, or the like for authentication is true.

Embodiments of the inventive concept provide a user authentication method for performing authentication without managing a password of a user in a certificate authority or an authentication server and enhancing security using a multi-element linked to time.

According to an aspect of an embodiment, a user authentication method using a user terminal and an authentication server may include generating, by the user terminal, a first common authentication key by combining a private password with a mechanical unique key of the user terminal and encrypting the combined information if a user of the user terminal enters the private password for user registration and providing, by the user terminal, the generated first common authentication key to the authentication server, and registering, by the authentication server, the first common authentication key and user information by matching the first common authentication key with the user information, generating, by the authentication server, a server authentication key by combining an embedded unique key of a certificate authority with the first common authentication key and encrypting the combined information and generating, by the authentication server, first server authentication information by calculating a one time password (OTP) by using the server authentication key as an operation key, and generating, by the user terminal, a second common authentication key by combining the private password with the mechanical unique key of the user terminal and encrypting the combined information if the user enters the private password for authentication, generating, by the user terminal, a user authentication key by combining the unique key of the certificate authority previously provided from the authentication server with the second common authentication key and encrypting the combined information, and generating, by the user terminal, first user authentication information by calculating an OTP by using the user authentication key as an operation key, and performing user authentication based on whether the first server authentication information is identical to the first user authentication information or performing authentication server authentication for determining whether the authentication server is true.

According to another aspect of an embodiment, a user authentication method may include generating, by a user terminal, a first common authentication key by combining a private password with a mechanical unique key of the user terminal and encrypting the combined information if a user of the user terminal enters the private password for user registration using the user terminal and providing, by the user terminal, the generated first common authentication key to an authentication server, and registering, by the authentication server, the first common authentication key and user information by matching the first common authentication key with the user information, generating, by the authentication server, a server authentication key by combining an embedded unique key of a certificate authority with the first common authentication key and encrypting the combined information and generating, by the authentication server, server authentication information by calculating an OTP using an operation key generated by combining the server authentication key a gap time value in which a time taken for the user to enter the private password is measured every 1/n seconds, wherein n is a positive real number, and a gap time key which is a numeral value extracted by criteria from the gap time value, measuring, by the user terminal, the gap time value if the user enters the private password for authentication and transmitting, by the user terminal, the measured gap time value to the authentication server, generating, by the user terminal, a second common authentication key in real time by combining the private password with the mechanical unique key of the user terminal and encrypting the combined information, generating, by the user terminal, a user authentication key by combining the unique key of the certificate authority previously provided from the authentication server with the second common authentication key and encrypting the combined information, and generating, by the user terminal, user authentication information by calculating an OTP using an operation key generated by combining the user authentication key with the gap time value or the gap time key, and performing user authentication base on whether the server authentication information is identical to the user authentication information.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the inventive concept are described with reference to the accompanying drawings so that this disclosure will be thorough and complete and will fully convey the scope of the inventive concept to those skilled in the art.

Figure 1:
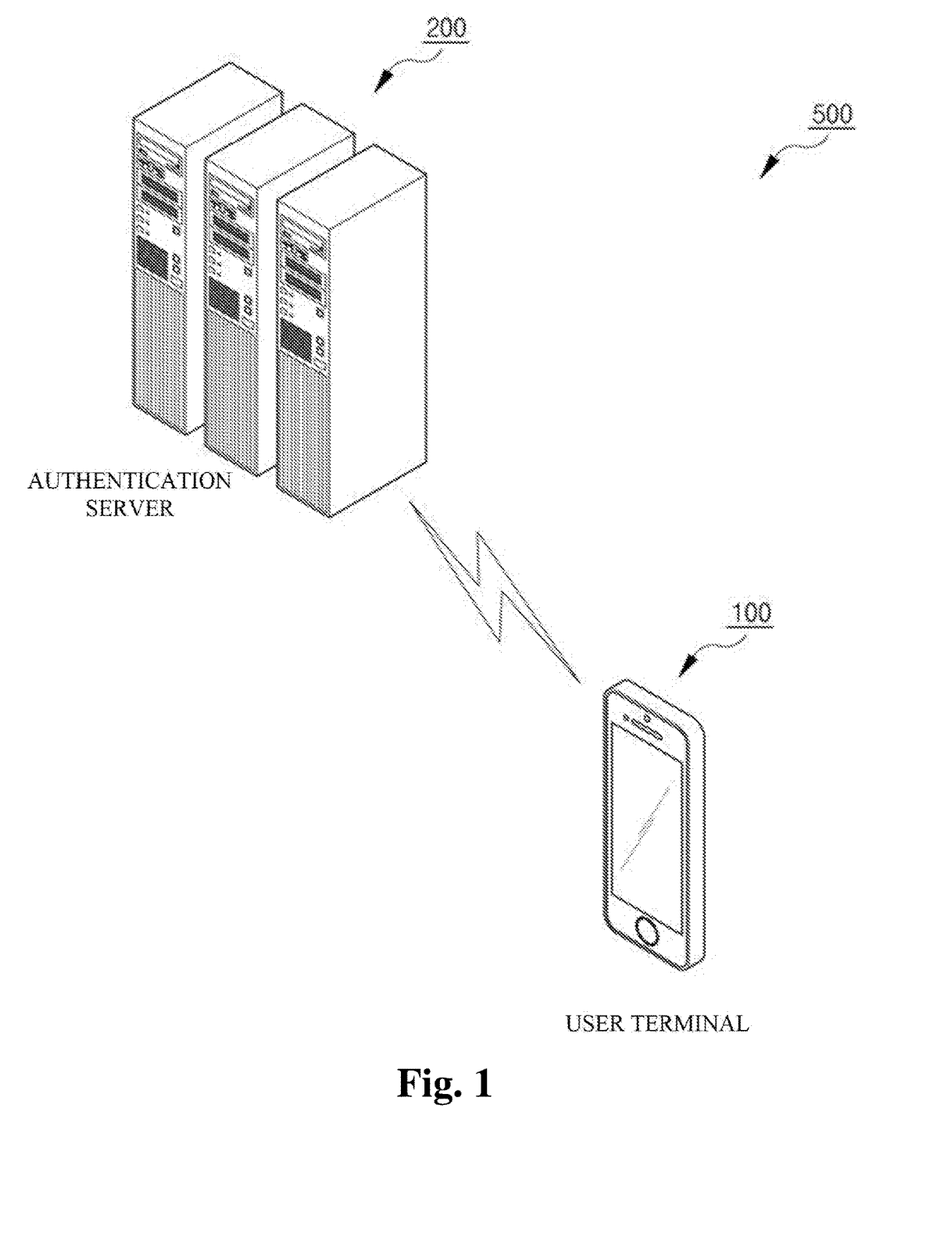
FIG. 1 is a drawing schematically illustrating an authentication device used in a user authentication method according to various embodiments.

FIG. 1 is a drawing schematically illustrating an authentication device 500 used in a user authentication method according to various embodiments.

As shown in FIG. 1, the authentication device 500 for the user authentication method according to various methods may include a user terminal 100 and an authentication server 200.

The user terminal 100 may be connected with the authentication server 200 over a wired and wireless Internet network. A dedicated application program (hereinafter referred to as "dedicated app") for user authentication provided from the authentication server 200 may be installed in the user terminal 100. The user terminal 100 may include a smartphone, a tablet, a personal digital assistant (PDA), and the like, and may also include a mobile terminal which is well known to those skilled in the art. Further, the user terminal 100 may include a desktop personal computer (PC), a laptop, a terminal for thin client, a terminal for zero-client, and the like. Herein, the terminal for thin client may be called a business terminal designed to manage all business at a central server connected thereto over a network in a state where it mounts only essential hardware devices such as a central processing unit (CPU) and a memory. The terminal for zero client may play a role as a terminal, in which it is unnecessary for PC body itself since all of essential components such as a memory are removed, which connects to only a server to process all business at the server.

In an embodiment, the user terminal 100 may be referred to as all terminals may perform wired and wireless communication which may be used by users. If necessary for explicit classification, a mobile terminal including a smartphone, a tablet, and a PDA may be referred to as a first user terminal and each of a desktop PC, a laptop, a terminal for thin client, and a terminal for zero-client may be referred to as a second user terminal. A reference denotation is used as the same numeral '100'.

The authentication server 200 may include a server which is used for an authentication procedure such as user authentication at a certificate authority such as a financial institution and may include an authentication server which is well known to those skilled in the art.

Numbers such as an authentication number and a password for authentication, a unique key, an authentication key, authentication information, and the like used below may be combinations of a character, a special character, a numeral, and various symbols. It may be apparent that the numbers, the unique key, the authentication key, the authentication information, and the like do not mean simple combinations of only numerals. The numbers, the unique key, the authentication key, the authentication information, and the like may refer to encrypted information or information which is not encrypted.

Further, hereinafter, various components performed in the user terminal 100 may be components performed by a dedicated app installed in the user terminal 100. Thus, to be performed by the user terminal 100 may mean to be performed by the dedicated app installed in the user terminal 100.

Further, the term 'certain criteria' are used at a plurality locations of the specification. Such certain criteria means there are any criteria or predetermined criteria and do not mean the same terms have the same criteria as each other although the same terms are used at a plurality of locations. Thus, if the term 'certain criteria' used herein is used at the plurality of locations, except if specifically noted, it does not mean the same criteria as each other. For example, there are a description of being extracted by certain criteria from a first common authentication key and a description of being extracted by certain criteria from a server authentication key, the certain criteria extracted from the first common authentication key and the certain criteria extracted from the server authentication key do not mean the same criteria as each other. In this case, the certain criteria and the certain criteria are the same as each other, but it is common that they have different criteria.

Hereinafter, a description will be given of a user authentication method according to embodiments using the user terminal 100 and the authentication server 200 which are basic components.

Figure 2:
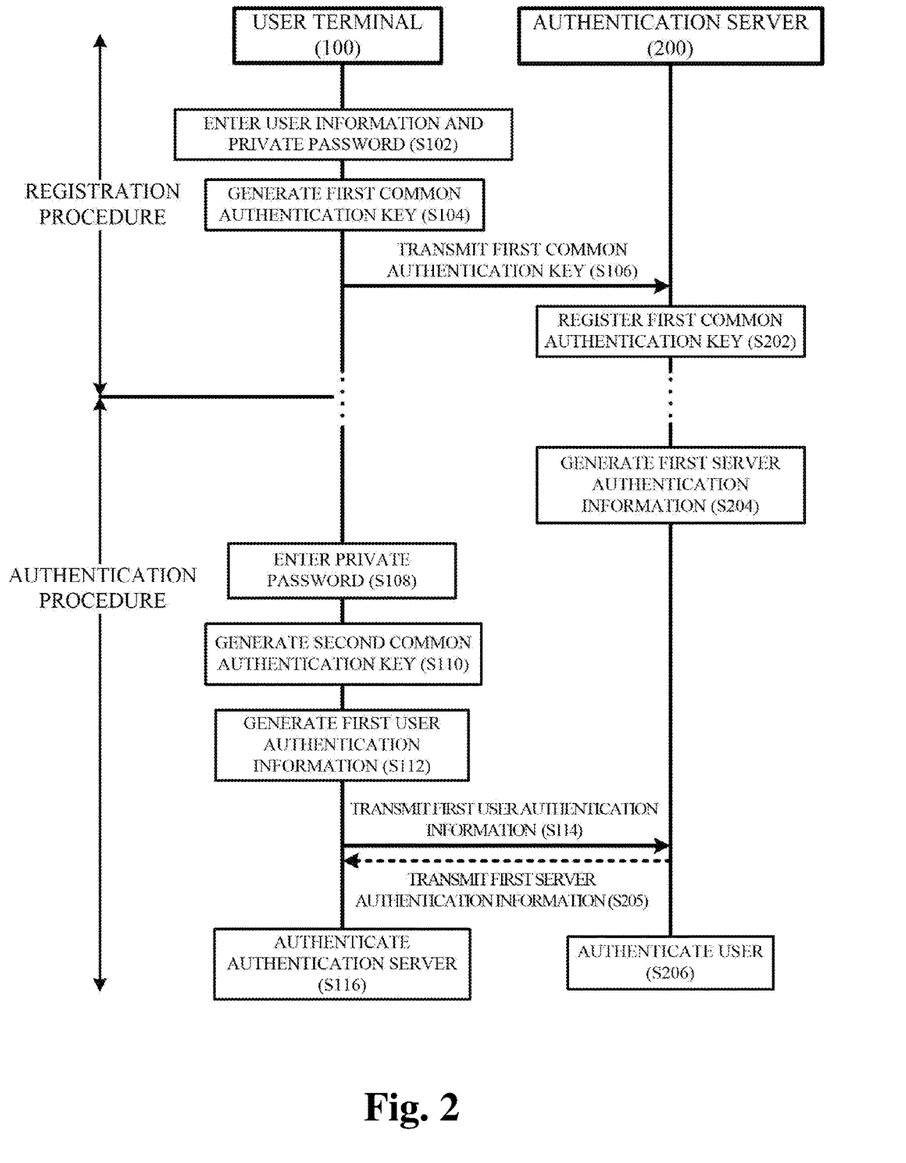
FIG. 2 is a signal sequence diagram illustrating a user authentication method according to an embodiment.

FIG. 2 is a signal sequence diagram illustrating a user authentication method according to an embodiment.

As shown in FIG. 2, a user authentication method according to an embodiment may be started for a user to download and install a dedicated app in a user terminal 100 for user registration. The user registration may be performed in a process of installing the dedicated app and may be performed through a separate process of registering the user after the dedicated app is installed.

If the user enters user information and a private password for the user registration using the user terminal 100 in step S102, in step S104, the user terminal 100 may generate a first common authentication key by combining the private password entered by the user and a mechanical unique key of the user terminal 100 and encrypting the combined information. Herein, the mechanical unique key of the user terminal 100 may include, for example, a serial number, a universal subscriber identity module (USIM) number, or the like. In addition, the mechanical unique key of the user terminal 100 may include various unique numbers and the like assigned to distinguish the user terminal 100.

An extraction value extracted from certain criteria from the mechanical unique key of the user terminal 100 or a user phone number may be further added as a component to the first common authentication key. In other words, the first common authentication key may be generated by combining the private password, the mechanical unique key of the user terminal 100, and the extraction value extracted by the certain criteria from the mechanical unique key of the user terminal 100 or the user phone number and encrypting the combined information. The extraction value extracted by the certain criteria from the mechanical unique key of the user terminal 100 or the user phone number may be extracted by certain criteria (e.g., criteria of extracting even-numbered or odd-numbered digital values from a first digit and sequentially arranging the extracted digital values, criteria of extracting and arranging even numbers, criteria of extracting and arranging odd numbers, or criteria of adding or subtracting a specific numeral to or from each digit value and arranging the added or subtracted digit values) which are predetermined criteria from, for example, the mechanical unique key of the user terminal or the user phone number, which has a structure where a plurality of numerals are arranged.

The first common authentication key may be generated in the form of a hash encryption value and may be generated by being encrypted using an encryption technology which is well known to those skilled in the art.

In step S106, the user terminal 100 may transmit the first common authentication key together with the user information to the authentication server 200.

In step S202, the authentication server 200 may match the first common authentication key transmitted from the user terminal 100 with the user information to register and store the first common authentication key together with the user information. Thus, the process of registering the user may be completed.

In the related art, if user registration is completed, in general, an authentication server stores a private password. However, according to an embodiment, the authentication server 200 or the user terminal 100 does not store a password, and the authentication server 200 stores only the first common authentication key. Thus, if the user forgets a private password or if the private password flows out, the user terminal 100 may transmit a first common authentication key including a new password to the authentication server 200 through a new registration procedure to register the first common authentication key in the authentication server 200. If the first common authentication key flows out through hacking and the like, a certificate authority may simply correspond to the outflow by changing extraction criteria of the extraction value extracted by the certain criteria from the mechanical unique key of the user terminal 100 or the user phone number, allowing the user terminal 100 to generate a new first common authentication key, and registering the newly generated first common authentication key.

In step S204, the authentication server 200 may first generate a server authentication key by combining an embedded unique key of the certificate authority with the first common authentication key and encrypting the combined information and generating first server authentication information synchronized with a time value by calculating a one time password (OTP) by using the server authentication key as an operation key. The first server authentication information may be independently generated irrespective of another procedure after the first common authentication key is registered. In other words, the first server authentication information may be enough to be generated within a time until first user authentication described below is generated after the first common authentication key is registered. The first server authentication information is transmitted to the user terminal 100 at the same time that it is generated, or at a necessary time after it is generated.

If the user enters the private password for authentication in step S108, in step S110, the user terminal 100 may generate a second common authentication key in real time by combining the private password with the mechanical unique key of the user terminal 100 and encrypting the combined information. The second common authentication key may be generated in the form of a hash encryption value. In addition, the second common authentication key may be generated by being encrypted using an encryption technology which is well known to those skilled in the art.

If the first common authentication key includes the extraction value extracted by the certain criteria from the mechanical unique key of the user terminal 100 or the user phone number, the extraction value extracted from the mechanical unique key of the user terminal 100 or the user phone number by the same criteria applied when the first common authentication key is generated may be included in the second common authentication key when the second common authentication key is generated. In other words, the method of generating the second common authentication key is the same as the method of generating the first common authentication key.

In contrast, the first common authentication key and the second common authentication key may be generated by a method different from the above-mentioned method.

As an example, to generate the first common authentication key, the user terminal 100 may sequentially extract m (m is a natural number) extraction values by the certain criteria from the mechanical unique key of the user terminal 100 or the user phone number and may combine the private password and the mechanical unique key of the user terminal 100 to each of the extraction values, thus generating corresponding m common authentication keys. Next, the user terminal 100 may transmit the m common authentication keys to the authentication server 200.

The authentication server 200 may select one of the m common authentication keys based on predetermined criteria and may register the selected common authentication key as a first common authentication key. For example, if there are criteria in which the authentication server 200 selects a common authentication key corresponding to a first extraction value among the extraction values and registers the selected common authentication key as the first common authentication key, unless there are different criteria, the common authentication key corresponding to the first extraction value may be registered as the first common authentication key. However, if there is an authentication key duplicated by the common authentication key among authentication keys registered in the authentication server 200 for another authentication or authentication of another person, to exclude duplication, a common authentication key corresponding to a second extraction value corresponding to a subsequent order or a subsequent degree among the common authentication keys may be selected and registered as the first common authentication key. If there is duplication in the common authentication key corresponding to the second extraction value, a common authentication key corresponding to an extraction value of an order where there is no duplication and may be registered as the first common authentication key.

If there are other criteria, a common authentication key selected based on the criteria may be registered as the first common authentication key. For example, if there are criteria in which 10 common authentication keys are generated and a common authentication key corresponding to a $5^{th}$ extraction value is selected, the common authentication key may be selected and registered as the first common authentication key. If there is duplication, a common authentication key corresponding to a subsequent extraction value may be selected and registered as the first common authentication key, or a common authentication key may be selected and registered as the first common authentication key based on other criteria if there are the other criteria.

The authentication server 200 may provide order value information of the registered first common authentication key or calculation information about the order value to the user terminal 100. If there are previously promised selection criteria or if the user terminal 100 knows the order value information of the first common authentication key, the process of transmitting the order value information or the calculation information about the order value may be omitted.

The authentication server 200 may transmit the order value information of the first common authentication key or the calculation information about the order value, included in the first server authentication information or to be independent of each other.

Herein, if the authentication server 200 transmits the order value information of the first common authentication key or the calculation information about the order value, included in the first authentication information, the first server authentication information should be transmitted to the user terminal 100 before the user terminal 100 generates the second common authentication key.

The order value information of the first common authentication key may mean information about whether the first common authentication key registered in the authentication server 200 is a common authentication key corresponding to an ith extraction value among m (m is a natural number) common authentication keys or order information of an extraction value included in the first common authentication key among the m extraction values.

In this case, to generate the second common authentication key, the user terminal 100 may sequentially extract the m extraction values by the certain criteria (e.g., the same criteria as being applied when the first common authentication key is generated) from the mechanical unique key of the user terminal 100 or the user phone number and may select an extraction value corresponding to the order value provided from the authentication server 200 among the extraction values, thus generating the second common authentication key.

In contrast, the user terminal 100 may extract the extraction corresponding to the order value by certain criteria from the mechanical unique key of the user terminal 100 or the user phone number to generate the second common authentication key. Thus, the second common authentication key may be generated by additionally including the extraction value corresponding to the order value in the private password and the mechanical unique key of the user terminal 100.

In step S112, the user terminal 100 may generate first user authentication information using the second common authentication key. The description is given above for generating the first server authentication information corresponding to the first user authentication information.

The user terminal 100 may first generate a user authentication key by combining a unique key of a certificate authority with the second common authentication key and encrypting the combined information and may generate first user authentication information synchronized with a time value by calculating an OTP by using the user authentication key as an operation key. Herein, the unique key of the certificate authority may be provided to the user terminal 100 when the dedicated app is installed in the user terminal 100, or may be provided to the user terminal 100 after it is updated before an authentication procedure is started.

Herein, an extraction value extracted by certain criteria from the second common authentication key may be further added as a component to the user authentication key. An extraction value extracted by certain criteria from the first common authentication may be further added as a component to the server authentication key. In this case, the extraction value of the second common authentication key added to the user authentication or the extraction value of the first common authentication key added to the server authentication key may be an extraction extracted from the first common authentication or the second common authentication key based on the same criteria.

An extraction value extracted by certain criteria from the user authentication key may be further added as a component to the operation key for generating the first user authentication information. An extraction value extracted by certain criteria from the server authentication key may be further added as a component to the operation key for generating the first server authentication information. In this case, the extraction value extracted from the user authentication key and the extraction value extracted from the server authentication key may be extraction values extracted by the same criteria. It is obvious that the methods of generating the first user authentication information and the first server authentication information should be the same as each other and the result values are identical to each other.

If the user terminal 100 transmits the first user authentication information to the authentication server 200 in step S114, in step S206, the authentication server 200 may perform user authentication based on whether authentication information are identical to each other, that is, whether the first user authentication information and the first server authentication information are identical to each other. The first user authentication information may be entered by the user to be manually transmitted. The first user authentication information may be automatically transmitted. The first user authentication information may be automatically transmitted by a transmission instruction of the user.

Herein, one or a plurality of user terminals connected with the authentication server 200 may be used as the user terminal 100. For example, the first user terminal 100 may proceed with a procedure of registering a first common authentication key and the like and the second user terminal 100 may proceed with an authentication procedure, and vice versa. Also, in case of an authentication procedure, first user authentication information may be generated by the first user terminal 100, and input or transmission of the first user authentication information may be performed by the second user terminal 100. In addition, a plurality of user terminals 100 may be used in various procedures.

The user may verify whether the authentication server 200 is true, whether an access web page connected to the authentication server 200 is true, or whether a service provider or a certificate authority which provides an authentication server is true by comparing the first user authentication information with the first server authentication information through the user terminal 100. In the related art, although there are many examples of configuring a web page similar to an access web page of a certificate authority and confusing users, there are no proper countermeasures to the examples. In an embodiment, the user may verify whether a certificate authority (or a service provider) is true to address the above-mentioned problem.

For this purpose, if the first server authentication information is generated, in step S205, the authentication server 200 may display the first server authentication information through the access web page or may transmit the first server authentication information to the user terminal 100. If the first server authentication information is displayed or transmitted, the user terminal 100 may determine whether the authentication server 200 is true or whether the access web page is true by comparing the first server authentication information with the first user authentication information. In other words, the user terminal 100 may verify whether the authentication server 200 is true, whether an access web page connected to the authentication server 200 is true, or whether a service provider or a certificate authority which provides an authentication server is true.

Herein, if the first server authentication information is transmitted to the user terminal 100 in advance before the second common authentication key is generated, the user terminal 100 may perform authentication server authentication using the first server authentication information transmitted in advance without the necessity of retransmitting or separately transmitting the first server authentication information.

In an embodiment, the user terminal 100 may perform certificate authority authentication or authentication server authentication of determining whether a certificate authority or the authentication server 200 is true through whether the first server authentication information is identical to the first user authentication information by comparing the first server authentication information with the first user authentication information. The authentication server 200 may perform user authentication through whether the first server authentication is identical to the first user authentication information by comparing the first server authentication information with the first user authentication information.

Herein, the authentication procedures S205 and S116 of authenticating the authentication server 200 and the user authentication procedures S114 and S206 may be performed at the same time. If authentication is verified after the authentication procedures of authenticating the authentication server 200 is first performed, the user authentication procedures S114 and S206 may be performed.

Figure 3:
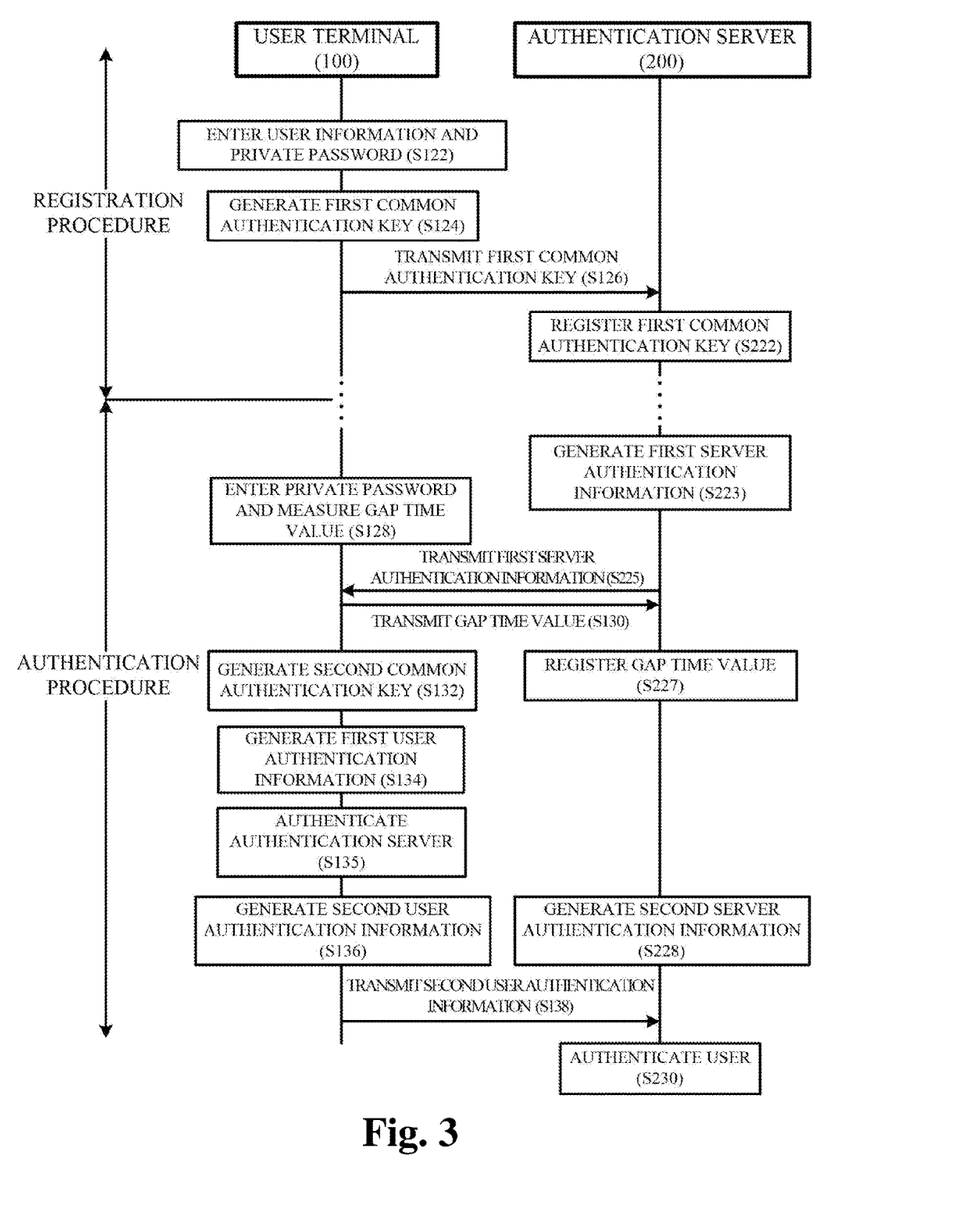
FIG. 3 is a signal sequence diagram illustrating a user authentication method according to another embodiment.

FIG. 3 is a signal sequence diagram illustrating a user authentication method according to another embodiment.

As shown in FIG. 3, a user authentication method according to another embodiment may be started for a user to download and install a dedicated app in a user terminal 100 for user registration. The user registration may be performed in a process of installing the dedicated app and may be performed through a separate process of registering the user after the dedicated app is installed.

If the user enters user information and a private password for the user registration using the user terminal 100 in step S122, in step S124, the user terminal 100 may generate a first common authentication key by combining the private password entered by the user and a mechanical unique key of the user terminal 100 and encrypting the combined information. Herein, the mechanical unique key of the user terminal 100 may include, for example, a serial number, a USIM number, or the like. In addition, the mechanical unique key of the user terminal 100 may include various unique numbers and the like assigned to distinguish the user terminal 100.

An extraction value extracted from certain criteria from the mechanical unique key of the user terminal 100 or a user phone number may be further added as a component to the first common authentication key. In other words, the first common authentication key may be generated by combining the private password, the mechanical unique key of the user terminal 100, and the extraction value extracted by the certain criteria from the mechanical unique key of the user terminal 100 or the user phone number and encrypting the combined information. The extraction value extracted by the certain criteria from the mechanical unique key of the user terminal 100 or the user phone number may be extracted by certain criteria (e.g., criteria of extracting even-numbered or odd-numbered digital values from a first digit and sequentially arranging the extracted digital values, criteria of extracting and arranging even numbers, criteria of extracting and arranging odd numbers, or criteria of adding or subtracting a specific numeral to or from each digit value and arranging the added or subtracted digit values) which are predetermined criteria from, for example, the mechanical unique key of the user terminal 100 or the user phone number, which has a structure where a plurality of numerals are arranged.

The first common authentication key may be generated in the form of a hash encryption value and may be generated by being encrypted using an encryption technology which is well known to those skilled in the art.

In step S126, the user terminal 100 may transmit the first common authentication key together with the user information to the authentication server 200.

In step S222, the authentication server 200 may match the first common authentication key transmitted from the user terminal 100 with the user information to register and store the first common authentication key together with the user information. Thus, the process of registering the user may be completed.

In the related art, if user registration is completed, in general, an authentication server stores a private password. However, according to another embodiment, the authentication server 200 or the user terminal 100 does not store a password, and the authentication server 200 stores only the first common authentication key. Thus, if the user forgets a private password or if the private password flows out, the user terminal 100 may transmit a first common authentication key including a new password to the authentication server 200 through a new registration procedure to register the first common authentication key in the authentication server 200. If the first common authentication key flows out through hacking and the like, a certificate authority may simply correspond to the outflow by changing extraction criteria of the extraction value extracted by the certain criteria from the mechanical unique key of the user terminal 100 or the user phone number, allowing the user terminal 100 to generate a new first common authentication key, and registering the newly generated first common authentication key.

In step S223, the authentication server 200 may first generate a server authentication key by combining an embedded unique key of the certificate authority with the first common authentication key and encrypting the combined information and may generate first server authentication information synchronized with a time value by calculating an OTP by using the server authentication key as an operation key. The first server authentication information may be independently generated irrespective of another procedure after the first common authentication key is registered. In other words, the first server authentication information may be enough to be generated within a time until first user authentication described below is generated after the first common authentication key is registered.

Further, if it is necessary to transmit the first server authentication information to the user terminal 100, a time when the first server authentication information is transmitted may vary if necessary. The first server authentication information is transmitted to the user terminal 100 at the same time that it is generated, or at a necessary time after it is generated. In FIG. 3, an embodiment is exemplified as the first server authentication information is transmitted to the user terminal 100 at the same time that it is generated. In step S225, the first server authentication information may be transmitted to the user terminal 100 at the same time that it is generated. In addition, the first server authentication information may be transmitted at a different time. For example, the first server authentication information may be transmitted at a time close to a time when the first user authentication information is generated or may be transmitted after the first user authentication information is generated.

If the user enters the private password using the user terminal 100 for authentication in step S128, in step 128, the user terminal 100 may measure a gap time value. In step S130, the measured gap time value may be transmitted to the authentication server 200.

The gap time value may refer to a time value in which a time taken for the user to enter the private password for authentication is measured every 1/n (n is a positive real number) seconds. Herein, the 1/n seconds may refer to a time unit of a range which may be divided in hard or software of the user terminal 100. For example, it may be expressed that it takes 10 seconds on a second basis to enter a private password from a first digit value to the last digit value. However, if the time taken to enter the private password is measured every $1/1000$ seconds, the measured value '10436' may be obtained. Alternatively, if the time taken to enter the private password is measured every $1/1000000$ seconds or every $1/10000000000$ seconds, the measured value including many numerals may be obtained.

Herein, if a time interval from a time when an input window for inputting the private password is displayed on a screen to a time when a first digit value of the private password is entered is defined as a first time interval and if a time interval from a time when the last digit value of the private password is entered to a time when a signal of an input key (or an enter key) for providing notification that the input of the private password is completed is input is defined as a second time interval, the gap time value may be a time measurement value from one time in the first time interval to one time in the second time interval.

If receiving the gap time value from the user terminal 100, in step S227, the authentication server 200 may match the gap time value with the user information, the first common authentication key, and the like to store and register the gap time value together with the user information, the first common authentication key, and the like.

As the private password is entered, in step S132, the user terminal 100 may generate a second common authentication key in real time by combining the private password with the mechanical unique key of the user terminal 100 and encrypting the combined information. The second common authentication key may be generated in the form of a hash encryption value. In addition, the second common authentication key may be generated by being encrypted using an encryption technology which is well known to those skilled in the art.

In this case, if the first common authentication key includes the extraction value extracted by the certain criteria from the mechanical unique key of the user terminal 100 or the user phone number, the extraction value extracted from the mechanical unique key of the user terminal 100 or the user phone number by the same criteria applied when the first common authentication key is generated may be included in the second common authentication key when the second common authentication is generated. In other words, the method of generating the second common authentication key is the same as the method of generating the first common authentication key.

In contrast, the first common authentication key and the second common authentication key may be generated by a method different from the above-mentioned method.

As an example, to generate the first common authentication key, the user terminal 100 may sequentially extract m (m is a natural number) extraction values by the certain criteria from the mechanical unique key of the user terminal 100 or the user phone number and may combine the private password and the mechanical unique key of the user terminal 100 to each of the extraction values, thus generating corresponding m common authentication keys. Next, the user terminal 100 may transmit the m common authentication keys to the authentication server 200.

The authentication server 200 may select one of the m common authentication keys based on predetermined criteria and may register the selected common authentication key as a first common authentication key. For example, if there are criteria in which the authentication server 200 selects a common authentication key corresponding to a first extraction value among the extraction values and registers the selected common authentication key as the first common authentication key, unless there are different criteria, the common authentication key corresponding to the first extraction value may be registered as the first common authentication key. However, if there is an authentication key duplicated by the common authentication key among authentication keys registered in the authentication server 200 for another authentication or authentication of another person, to exclude duplication, a common authentication key corresponding to a second extraction value corresponding to a subsequent order or a subsequent degree among the common authentication keys may be selected and registered as the first common authentication key. If there is duplication in the common authentication key corresponding to the second extraction value, a common authentication key corresponding to an extraction value of an order where there is no duplication and may be registered as the first common authentication key.

If there are other criteria, a common authentication key selected based on the criteria may be registered as the first common authentication key. For example, if there are criteria in which 10 common authentication keys are generated and a common authentication key corresponding to a $5^{th}$ extraction value is selected, the common authentication key may be selected and registered as the first common authentication key. If there is duplication, a common authentication key corresponding to a subsequent extraction value may be selected and registered as the first common authentication key, or a common authentication key may be selected and registered as the first common authentication key based on other criteria if there are the other criteria.

The authentication server 200 may provide order value information of the registered first common authentication key or calculation information about the order value to the user terminal 100. If there are previously promised selection criteria or if the user terminal 100 knows the order value information of the first common authentication key, the process of transmitting the order value information or the calculation information about the order value may be omitted.

The authentication server 200 may transmit the order value information of the first common authentication key or the calculation information about the order value, included in the first server authentication information or to be independent of each other.

Herein, if the authentication server 200 transmits the order value information of the first common authentication key or the calculation information about the order value, included in the first authentication information, in step S225, the first server authentication information should be transmitted to the user terminal 100 before the user terminal 100 generates the second common authentication key.

The order value information of the first common authentication key may mean information about whether the first common authentication key registered in the authentication server 200 is a common authentication key corresponding to an ith extraction value among m (m is a natural number) common authentication keys or order information of an extraction value included in the first common authentication key among the m extraction values.

In this case, to generate the second common authentication key, the user terminal 100 may sequentially extract the m extraction values by the certain criteria (e.g., the same criteria as being applied when the first common authentication key is generated) from the mechanical unique key of the user terminal 100 or the user phone number and may select an extraction value corresponding to the order value provided from the authentication server 200 among the extraction values, thus generating the second common authentication key.

In contrast, the user terminal 100 may extract the extraction value corresponding to the order value by certain criteria from the mechanical unique key of the user terminal 100 or the user phone number to generate the second common authentication key. Thus, the second common authentication key may be generated by additionally including the extraction value corresponding to the order value in the private password and the mechanical unique key of the user terminal 100.

In step S134, the user terminal 100 may generate first user authentication information using the second common authentication key. The description is given above for generating the first server authentication information corresponding to the first user authentication information.

The user terminal 100 may first generate a user authentication key by combining the unique key of the certificate authority with the second common authentication key and encrypting the combined information and may generate first user authentication information synchronized with a time value by calculating an OTP by using the user authentication key as an operation key. Herein, the unique key of the certificate authority may be provided to the user terminal 100 when the dedicated app is installed in the user terminal 100, or may be provided to the user terminal 100 after it is updated before an authentication procedure is started.

Herein, an extraction value extracted by certain criteria from the second common authentication key may be further added as a component to the user authentication key. An extraction value extracted by certain criteria from the first common authentication may be further added as a component to the server authentication key. In this case, the extraction value of the second common authentication key added to the user authentication or the extraction value of the first common authentication key added to the server authentication key may be an extraction extracted from the first common authentication or the second common authentication key based on the same criteria.

An extraction value extracted by criteria from the user authentication key may be further added as a component to the operation key for generating the first user authentication information. An extraction value extracted by certain criteria from the server authentication key may be further added as a component to the operation key for generating the first server authentication information. In this case, the extraction value extracted from the user authentication key and the extraction value extracted from the server authentication key may be extraction values extracted by the same criteria. It is obvious that the methods of generating the first user authentication information and the first server authentication information should be the same as each other and the result values are identical to each other.

In such state, the user terminal 100 may transmit the first user authentication information to the authentication server 200. The authentication server 200 may perform primary user authentication by comparing the first user authentication information with the first server authentication information to determine whether the first user authentication information is identical to the first server authentication information.

In other words, if the user terminal 100 transmits the first user authentication information to the authentication server 200, the authentication server 200 may perform primary user authentication based on whether authentication information are identical to each other, that is, whether the first user authentication information and the first server authentication information are identical to each other. The first user authentication information may be entered by the user to be manually transmitted. The first user authentication information may be automatically transmitted without a specific instruction or mention. The first user authentication information may be automatically transmitted by a transmission instruction of the user.

Herein, one or a plurality of user terminals connected with the authentication server 200 may be used as the user terminal 100. For example, the first user terminal 100 may proceed with a procedure of registering a first common authentication key and the like and the second user terminal 100 may proceed with an authentication procedure, and vice versa. Also, in case of an authentication procedure, first user authentication information may be generated by the first user terminal 100, and input or transmission of the first user authentication information may be performed by the second user terminal 100. In addition, the plurality of user terminals 100 may be used in various procedures.

The process of performing the primary user authentication by comparing the first user authentication information with the first server authentication information to determine whether the first user authentication information is identical to the first server authentication information may be elected and omitted if necessary.

The user may verify whether the authentication server 200 is true, whether an access web page connected to the authentication server 200 is true, or whether a service provider or a certificate authority which provides an authentication server is true by comparing the first user authentication information with the first server authentication information through the user terminal 100.

For this purpose, if the first server authentication information is generated, in step S225, the authentication server 200 may display the first server authentication information through the access web page or may transmit the first server authentication information to the user terminal 100. If the first server authentication information is displayed or transmitted, in step S135, the user terminal 100 may determine whether the authentication server 200 is true or whether the access web page is true by comparing the first server authentication information with the first user authentication information. In other words, the user terminal 100 may perform authentication server authentication for verifying whether the authentication server 200 is true, whether an access web page connected to the authentication server 200 is true, or whether a service provider or a certificate authority which provides an authentication server is true.

Herein, if the first server authentication information is transmitted to the user terminal 100 in advance before the second common authentication key is generated in step S225, the user terminal 100 may perform authentication server authentication using the first server authentication information transmitted in advance without the necessity of retransmitting or separately transmitting the first server authentication information.

As a result, the user terminal 100 may perform certificate authority authentication or authentication server authentication of determining whether a certificate authority or the authentication server 200 is true through whether the first server authentication information is identical to the first user authentication information by comparing the first server authentication information with the first user authentication information. The authentication server 200 may perform user authentication through whether the first server authentication is identical to the first user authentication information by comparing the first server authentication information with the first user authentication information.

Herein, the authentication procedures S225 and S135 of authenticating the authentication server 200 and the user authentication procedures may be performed at the same time. If authentication is verified after the authentication procedures of authenticating the authentication server 200 is first performed, the user authentication procedures may be performed. As one of the user authentication and the authentication server authentication is selected, an authentication process may be performed. In FIG. 3, an embodiment is exemplified as only authentication of the authentication server 200 is performed.

The user terminal 100 may generate an operation key by including a variety of authentication information, an authentication key, and at least one of extraction values in the gap time value or a gap time key which is a numeral value extracted by certain criteria from the gap time value. Also, in step S136, the user terminal 100 may generate second user authentication information synchronized with a time value using the operation key.

For example, the user terminal 100 may generate an operation key by additionally combining at least one selected among the first user authentication information, an extraction value extracted by certain criteria from the first user authentication information, the user authentication key, an extraction value extracted by certain criteria from the user authentication key, the second common authentication key, and an extraction value extracted by certain criteria from the second common authentication key with the gap time value or the gap time key and may generate second user authentication information synchronized with a time value by calculating an OTP using the operation key.

The authentication server 200 may generate an operation key by including a variety of authentication information, an authentication key, and at least one of extraction values in the gap time value or a gap time key which is a numeral value extracted by certain criteria from the gap time value. Also, in step S228, the authentication server 200 may generate second server authentication information using the operation key.

Herein, the gap time value used in the authentication server 200 may refer to a gap time value which is transmitted from the user terminal 100 and is previously stored in the authentication server 200. Also, the gap time key used in the user terminal 100 or the gap time key used in the authentication server 200 may be an extraction value separately extracted by the same extraction criteria.

For example, in step S228, the authentication server 200 may generate an operation key by additionally combing at least one selected among the first server authentication information, an extraction value extracted by certain criteria from the first server authentication information, the server authentication key, an extraction value extracted by certain criteria from the server authentication key, the first common authentication key, and an extraction value extracted by certain criteria from the first common authentication key with the gap time value or the gap time key and may generate second server authentication information synchronized with a time value to correspond to second user authentication information by calculating an OTP using the operation key.

In detail, the second user authentication information may be generated by calculating an OTP using the operation key generated by combining the extraction value extracted by the certain criteria from the first user authentication information and the user authentication key with the gap time value or the gap time key. The second server authentication information may be generated by calculating an OTP using the operation key generated by combining the extraction value extracted by the certain criteria from the first sever authentication information and the server authentication key with the gap time value or the gap time key.

As another example, the second user authentication information may be generated by calculating an OTP using the operation key generated by combining the user authentication key and the extraction value extracted by the certain criteria from the user authentication key with the gap time value or the gap time key. The second server authentication information may be generated by calculating an OTP using the operation key generated by combining the sever authentication key and the extraction value extracted by the certain criteria from the server authentication key with the gap time value or the gap time key.

In addition, the second user authentication information and the second server authentication information may be generated by various combinations.

if the user terminal 100 transmits the second user authentication information to the authentication server 200 in step S138, in step S230, the authentication server 200 may perform user authentication based on whether authentication information are identical to each other, that is, whether the second user authentication information and the second server authentication information are identical to each other. The second user authentication information may be entered by the user to be manually transmitted. The second user authentication information may be automatically transmitted. The second user authentication information may be automatically transmitted by a transmission instruction of the user.

Herein, the second user authentication information may be generated by the first user terminal 100, and input or transmission of the second user authentication information may be performed through the second user terminal 100. In addition, the plurality of user terminals 100 may be used in various procedures.

According to another embodiment, the primary user authentication may be performed using the first server authentication information and the first user authentication information, and the secondary user authentication information may be performed using the second server authentication information and the second user authentication information. Also, the first server authentication information and the first user authentication information may be used for authentication of the authentication server 200 (e.g., authentication for verifying where a web page, a certificate authority, or an authentication service provider is true), and the second server authentication information and the second user authentication may be used for user authentication.

The primary user authentication and the secondary user authentication may be performed in such a manner as to perform the primary user authentication and perform the secondary user authentication if the second user authentication information and the second server authentication information are generated. In another manner, after the second user authentication information and the second server authentication information are generated, the primary user authentication and the second user authentication may be performed in such a manner as to be sequentially performed.

Further, if the first server authentication information and the first user authentication information is used for authentication of the authentication server 200 (e.g., authentication for verifying where a web page, a certificate authority, or an authentication service provider is true) and if the second server authentication information and the second user authentication is used for user authentication, the second user authentication information and the second server authentication may be generated after authentication of the authentication server 200 is performed. Thus, the user authentication may be performed using the second user authentication information and the second server authentication. In contrast, after the second server authentication information and the second user authentication information are generated, authentication of the authentication server 200 using the first server authentication information and the first user authentication information may be performed and user authentication using the second server authentication information and the second user authentication information may be sequentially performed.

Figure 4:
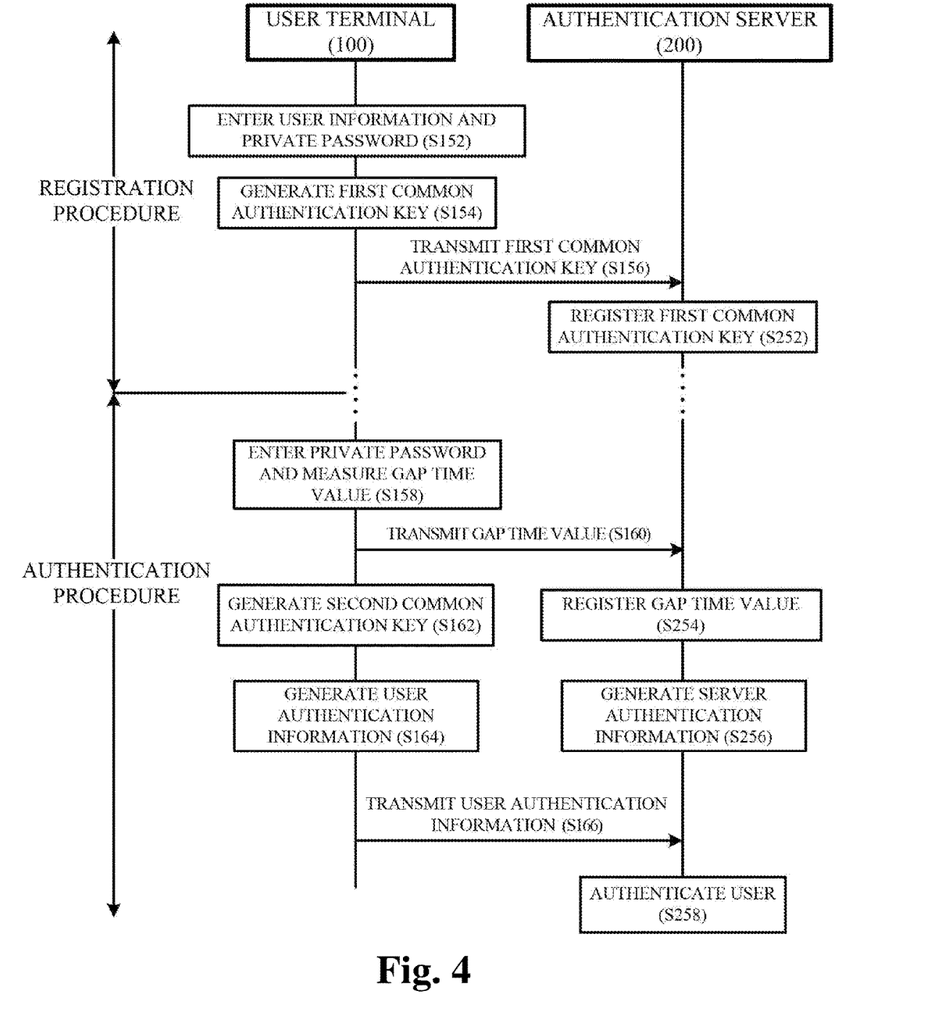
FIG. 4 is a signal sequence diagram illustrating a user authentication method according to another embodiment.

FIG. 4 is a signal sequence diagram illustrating a user authentication method according to another embodiment.

As shown in FIG. 4, a user authentication method according to another embodiment may be started for a user to download and install a dedicated app in a user terminal 100 for user registration. The user registration may be performed in a process of installing the dedicated app and may be performed through a separate process of registering the user after the dedicated app is installed.

If the user enters user information and a private password for the user registration through the user terminal 100 in step S152, in step S154, the user terminal 100 may generate a first common authentication key by combining the private password entered by the user and a mechanical unique key of the user terminal 100 and encrypting the combined information. Herein, the mechanical unique key of the user terminal 100 may include, for example, a serial number, a USIM number, or the like. In addition, the mechanical unique key of the user terminal 100 may include various unique numbers and the like assigned to distinguish the user terminal 100.

An extraction value extracted from certain criteria from the mechanical unique key of the user terminal 100 or a user phone number may be further added as a component to the first common authentication key. In other words, the first common authentication key may be generated by combining the private password, the mechanical unique key of the user terminal 100, and the extraction value extracted by the certain criteria from the mechanical unique key of the user terminal 100 or the user phone number and encrypting the combined information.

The extraction value extracted by the certain criteria from the mechanical unique key of the user terminal 100 or the user phone number may be extracted by certain criteria (e.g., criteria of extracting even-numbered or odd-numbered digital values from a first digit and sequentially arranging the extracted digital values, criteria of extracting and arranging even numbers, criteria of extracting and arranging odd numbers, or criteria of adding or subtracting a specific numeral to or from each digit value and arranging the added or subtracted digit values) which are predetermined criteria from, for example, the mechanical unique key of the user terminal or the user phone number, which has a structure where a plurality of numerals are arranged.

The first common authentication key may be generated in the form of a hash encryption value and may be generated by being encrypted using an encryption technology which is well known to those skilled in the art.

In step S156, the user terminal 100 may transmit the first common authentication key together with the user information to the authentication server 200.

In step S252, the authentication server 200 may match the first common authentication key transmitted from the user terminal 100 with the user information to register and store the first common authentication key together with the user information. Thus, the process of registering the user may be completed.

In the related art, if user registration is completed, in general, an authentication server stores a private password. However, according to another embodiment, the authentication server 200 or the user terminal 100 does not store a password, and the authentication server 200 stores only the first common authentication key. Thus, if the user forgets a private password or if the private password flows out, the user terminal 100 may transmit a first common authentication key including a new password to the authentication server 200 through a new registration procedure to register the first common authentication key in the authentication server. If the first common authentication key flows out through hacking and the like, a certificate authority may simply correspond to the outflow by changing extraction criteria of the extraction value extracted by the certain criteria from the mechanical unique key of the user terminal 100 or the user phone number, allowing the user terminal 100 to generate a new first common authentication key, and registering the newly generated first common authentication key.

If the user enters the private password using the user terminal 100 for authentication in step S158, in step 158, the user terminal 100 may measure a gap time value. In step S160, the measured gap time value may be transmitted to the authentication server 200.

The gap time value may refer to a time value in which a time taken for the user to enter a private password for authentication is measured every 1/n (n is a positive real number) seconds. Herein, the 1/n seconds may refer to a time unit of a range which may be divided in hard or software of the user terminal 100. For example, it may be expressed that it takes 10 seconds on a second basis to enter a private password from a first digit value to the last digit value. However, if the time taken to enter the private password is measured every $1/1000$ seconds, the measured value '10436' may be obtained. Alternatively, if the time taken to enter the private password is measured every $1/1000000$ seconds or every $1/10000000000$ seconds, the measured value including many numerals may be obtained.

Herein, if a time interval from a time when an input window for entering the private password is displayed on a screen to a time when a first digit value of the private password is entered is defined as a first time interval and if a time interval from a time when the last digit value of the private password is entered to a time when a signal of an input key (or an enter key) for providing notification that the input of the private password is completed is input is defined as a second time interval, the gap time value may be a time measurement value from one time in the first time interval to one time in the second time interval.

If receiving the gap time value from the user terminal 100, in step S254, the authentication server 200 may match the gap time value with the user information, the first common authentication key, and the like to store and register the gap time value together with the user information, the first common authentication key, and the like.

As the private password is entered, in step S162, the user terminal 100 may generate a second common authentication key in real time by combining the private password with the mechanical unique key of the user terminal 100 and encrypting the combined information. The second common authentication key may be generated in the form of a hash encryption value. In addition, the second common authentication key may be generated by being encrypted using an encryption technology which is well known to those skilled in the art.

In this case, if the first common authentication key includes the extraction value extracted by the certain criteria from the mechanical unique key of the user terminal 100 or the user phone number, the extraction value extracted from the mechanical unique key of the user terminal 100 or the user phone number by the same criteria applied when the first common authentication key is generated may be included in the second common authentication key when the second common authentication is generated. In other words, the method of generating the second common authentication key is the same as the method of generating the first common authentication key.

In contrast, the first common authentication key and the second common authentication key may be generated by a method different from the above-mentioned method.

As an example, to generate the first common authentication key, the user terminal 100 may sequentially extract m (m is a natural number) extraction values by the certain criteria from the mechanical unique key of the user terminal 100 or the user phone number and may combine the private password and the mechanical unique key of the user terminal 100 to each of the extraction values, thus generating corresponding m common authentication keys. Next, the user terminal 100 may transmit the m common authentication keys to the authentication server 200.

The authentication server 200 may select one of the m common authentication keys based on predetermined criteria and may register the selected common authentication key as a first common authentication key. For example, if there are criteria in which the authentication server 200 selects a common authentication key corresponding to a first extraction value among the extraction values and registers the selected common authentication key as the first common authentication key, unless there are different criteria, the common authentication key corresponding to the first extraction value may be registered as the first common authentication key. However, if there is an authentication key duplicated by the common authentication key among authentication keys registered in the authentication server 200 for another authentication or authentication of another person, to exclude duplication, a common authentication key corresponding to a second extraction value corresponding to a subsequent order or a subsequent degree among the common authentication keys may be selected and registered as the first common authentication key. If there is duplication in the common authentication key corresponding to the second extraction value, a common authentication key corresponding to an extraction value of an order where there is no duplication and may be registered as the first common authentication key.

If there are other criteria, a common authentication key selected based on the criteria may be registered as the first common authentication key. For example, if there are criteria in which 10 common authentication keys are generated and a common authentication key corresponding to a $5^{th}$ extraction value is selected, the common authentication key may be selected and registered as the first common authentication key. If there is duplication, a common authentication key corresponding to a subsequent extraction value may be selected and registered as the first common authentication key, or a common authentication key may be selected and registered as the first common authentication key based on other criteria if there are the other criteria.

The authentication server 200 may provide order value information of the registered first common authentication key or calculation information about the order value to the user terminal 100. If there are previously promised selection criteria or if the user terminal 100 knows the order value information of the first common authentication key, the process of transmitting the order value information or the calculation information about the order value may be omitted.

The authentication server 200 may transmit the order value information of the first common authentication key or the calculation information about the order value, included in the server authentication information or to be independent of each other.

Herein, if the authentication server 200 transmits the order value information of the first common authentication key or the calculation information about the order value, included in the authentication information, the server authentication information should be transmitted to the user terminal before the user terminal 100 generates the second common authentication key.

In this case, if the user terminal 100 transmits the gap time value to the authentication server 200, the authentication server 200 may immediately generate server authentication information. Herein, if transmitting the order value information of the first common authentication key or the calculation information about the order information, included in the server authentication information, the user terminal 100 may progress in such a manner as to generate a second common authentication key using the order value information of the first common authentication key or the calculation information about the order value.

The order value information of the first common authentication key may mean information about whether the first common authentication key registered in the authentication server 200 is a common authentication key corresponding to an ith extraction value among m (m is a natural number) common authentication keys or order information of an extraction value included in the first common authentication key among the m extraction values.

In this case, to generate the second common authentication key, the user terminal 100 may sequentially extract the m extraction values by the certain criteria (e.g., the same criteria as being applied when the first common authentication key is generated) from the mechanical unique key of the user terminal 100 or the user phone number and may select an extraction value corresponding to the order value provided from the authentication server 200 among the extraction values, thus generating the second common authentication key.

In contrast, the user terminal 100 may extract the extraction value corresponding to the order value by certain criteria from the mechanical unique key of the user terminal 100 or the user phone number to generate the second common authentication key. Thus, the second common authentication key may be generated by including the extraction value corresponding to the order value in the private password and the mechanical unique key of the user terminal 100.

In step S164, the user terminal 100 may generate user authentication information using the second common authentication key and the gap time value. IN step S256, the authentication server 164 may generate server authentication information using the first common authentication key and the gap time value. The description is given above for generating the first server authentication information corresponding to the first user authentication information.

In step S164, the user terminal 100 may first generate a user authentication key by combining a unique key of a certificate authority with the second common authentication key and encrypting the combined information and may generate user authentication information synchronized with a time value by calculating an OTP using an operation key generated by combining the user authentication key with the gap time value or a gap time key which is a numeral value extracted by certain criteria from the gap time value.

Herein, the unique key of the certificate authority may be provided to the user terminal 100 when the dedicated app is installed in the user terminal 100, or may be provided to the user terminal 100 after it is updated before an authentication procedure is started.

In step S256, the authentication server 200 may first generate a server authentication key by combining an embedded unique key of the certificate authority with the first common authentication key and encrypting the combined information and may generate server authentication information synchronized with a time value by calculating an OTP by using an operation key generated by combining the server authentication key with the gap time value or a gap time key which is a numeral value extracted by certain criteria from the gap time value.

Herein, the gap time value used in the authentication server 200 may refer to a gap time value which is transmitted from the user terminal 100 and is previously stored in the authentication server 200. Also, the gap time key used in the user terminal 100 or the gap time key used in the authentication server 200 may be an extraction value separately extracted by the same extraction criteria.

An extraction value extracted by certain criteria from the second common authentication key may be further added as a component to the user authentication key. An extraction value extracted by certain criteria from the first common authentication may be further added as a component to the server authentication key. In this case, the extraction value of the second common authentication key added to the user authentication or the extraction value of the first common authentication key added to the server authentication key may be an extraction extracted from the first common authentication or the second common authentication key based on the same criteria.

An extraction value extracted by criteria from the user authentication key may be further added as a component to the operation key for generating the user authentication information. An extraction value extracted by certain criteria from the server authentication key may be further added as a component to the operation key for generating the server authentication information. In this case, the extraction value extracted from the user authentication key and the extraction value extracted from the server authentication key may be extraction values extracted by the same criteria.

In such state, in step S166, the user terminal 100 may transmit the user authentication information to the authentication server 200. In step S258, the authentication server 200 may perform user authentication by comparing the user authentication information with the server authentication information to determine whether the user authentication information is identical to the server authentication information.

In other words, if the user terminal 100 transmits the user authentication information to the authentication server 200, in step S258, the authentication server 200 may perform user authentication based on whether authentication information are identical to each other, that is, whether the user authentication information and the server authentication information are identical to each other. The user authentication information may be entered by the user to be manually transmitted. The user authentication information may be automatically transmitted. The user authentication information may be automatically transmitted by a transmission instruction of the user.

Herein, one or a plurality of user terminals connected with the authentication server 200 may be used as the user terminal 100. For example, the first user terminal 100 may proceed with a procedure of registering a first common authentication key and the like and the second user terminal 100 may proceed with an authentication procedure, and vice versa. Also, in case of an authentication procedure, user authentication information may be generated by the first user terminal 100, and input or transmission of the user authentication information may be performed by the second user terminal 100. In addition, the plurality of user terminals 100 may be used in various procedures.

According to embodiments, the user authentication may be performed using the gap time value or the gap time key which does not attempt or are not defined in the related art. Other than the above-mentioned embodiments, components for generating authentication information for user authentication using the gap time value or gap time key and the private password may be changed in various manners by adding various components to the components. Also, the gap time key or the gap time value may be added to the method of generating authentication information, well known to those skilled in the art. Such components may be included in embodiments.

As described above, according to various embodiments, the authentication method may enhance security by simply corresponding to an outflow of a password or other personal information when the password or personal information flows out and may easily perform user authentication. Further, the authentication method may perform user authentication by checking whether an authentication server, a certificate authority, a web site, or the like for authentication is true and ensuring integrity and exclusiveness.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A user authentication method using a user terminal and an authentication server, the method comprising:
   generating, by the user terminal, a first common authentication key by combining a private password with a mechanical unique key of the user terminal and encrypting the combined information if a user of the user terminal enters the private password for user registration and providing, by the user terminal, the generated first common authentication key to the authentication server, and registering, by the authentication server, the first common authentication key and user information by matching the first common authentication key with the user information;
   generating, by the authentication server, a server authentication key by combining an embedded unique key of a certificate authority with the first common authentication key and encrypting the combined information and generating, by the authentication server, first server authentication information by calculating a first one time password (OTP) by using the server authentication key as a first operation key, and generating, by the user terminal, a second common authentication key by combining the private password with the mechanical unique key of the user terminal and encrypting the combined information if the user enters the private password for authentication, generating, by the user terminal, a user authentication key by combining the unique key of the certificate authority previously provided from the authentication server with the second common authentication key and encrypting the combined information, and generating, by the user terminal, first user authentication information by calculating a second OTP by using the user authentication key as a second operation key; and
   performing, by the authentication server, user authentication when the first server authentication information is identical to the first user authentication information.

2. The method of claim 1, wherein the first common authentication key or the second common authentication key comprises an extraction value extracted by criteria from the mechanical unique key of the user terminal or a user phone number.

3. The method of claim 2,
   wherein the generating of the first common authentication key comprises:
      sequentially extracting, by the user terminal, m extraction values, wherein m is a natural number, by criteria from the mechanical unique key of the user terminal when generating the first common authentication key,
      generating, by the user terminal, m common authentication keys corresponding to the m extraction values, and
      transmitting, by the user terminal, the m common authentication keys to the authentication server,
   wherein the registering of the first common authentication key comprises:
      registering, by the authentication server, a common authentication key selected by criteria among the m common authentication keys as the first common authentication key, and
   wherein the generating of the second common authentication key comprises:
      generating, by the user terminal, the second common authentication key by selecting and including an extraction value having an order value corresponding to the first common authentication key among the m extraction values sequentially extracted by the criteria from the mechanical unique key of the user terminal.

4. The method of claim 1,
   wherein the user authentication key comprises an extraction value extracted by criteria from the second common authentication key and wherein the server authentication key comprises an extraction value extracted by criteria from the first common authentication key, and
   wherein the second operation key for generating the first user authentication information comprises an extraction value extracted by criteria from the user authentication key and the first operation key for generating the first server authentication information comprises an extraction value extracted by criteria from the server authentication key.

5. The method of claim 1, further comprising
performing, by the user terminal, the authentication server authentication for determining whether the authentication server is authenticated by comparing the first server authentication information with the first user authentication information.

6. The method of claim 1, further comprising:
generating, by the user terminal, second user authentication information by calculating a third OTP using a third operation key generated by combining at least one selected among the first user authentication information, an extraction value extracted by criteria from the first user authentication information, the user authentication key, an extraction value extracted by criteria from the user authentication key, the second common authentication key, and an extraction value extracted by criteria from the second common authentication key with a gap time value or a tap time key which is a numeral key extracted by criteria from the gap time value;
generating, by the authentication server, second server authentication information corresponding to the second user authentication information by calculating a fourth OTP using a fourth operation key generated by combining at least one selected among the first server authentication information, an extraction value extracted by criteria from the first server authentication information, the server authentication key, an extraction value extracted by criteria from the server authentication key, the first common authentication key, and an extraction value extracted by criteria from the first common authentication key with the gap time value or a tap time key which is a numeral key extracted by criteria from the gap time value; and
performing, by the authentication server, the user authentication when the second user authentication is identical to the second server authentication information,
wherein the generating of the first user authentication information further comprises:
measuring, by the user terminal, the gap time value which is a time value in which a time taken for the user to enter the private password for authentication is measured every 1/n seconds, wherein n is a positive real number and transmitting, by the user terminal, the measured gap time value to the authentication server.

7. The method of claim 6, wherein, when a time interval from a time when an input window for inputting the private password is displayed on a screen to a time when a first digit value of the private password is entered is defined as a first time interval and when a time interval from a time when a last digit value of the private password is entered to a time when a signal of an input key or an enter key for providing notification that the input of the private password is completed is entered is defined as a second time interval, the gap time value is a time measurement value from one time in the first time interval to one time in the second time interval.

8. The method of claim 7,
wherein the second user authentication information is generated by calculating the third OTP using the third operation key generated by combining an extraction value extracted by criteria from the first user authentication information and the user authentication key with the gap time value or the gap time key, and
wherein the second server authentication information is generated by calculating the fourth OTP using the fourth operation key generated by combining an extraction value extracted by criteria from the first server authentication information and the server authentication key with the gap time value or the gap time key.

9. The method of claim 7,
wherein the second user authentication information is generated by calculating the third OTP using the third operation key generated by combining the user authentication key and an extraction value extracted by criteria from the user authentication key with the gap time value or the gap time key, and
wherein the second server authentication information is generated by calculating the fourth OTP using the fourth operation key generated by combining the server authentication key and an extraction value extracted by criteria from the server authentication key with the gap time value or the gap time key.

10. A user authentication method, the method comprising:
generating, by a user terminal, a first common authentication key by combining a private password with a mechanical unique key of the user terminal and encrypting the combined information if a user of the user terminal enters the private password for user registration using the user terminal and providing, by the user terminal, the generated first common authentication key to an authentication server, and registering, by the authentication server, the first common authentication key and user information by matching the first common authentication key with the user information;
generating, by the authentication server, a server authentication key by combining an embedded unique key of a certificate authority with the first common authentication key and encrypting the combined information and generating, by the authentication server, server authentication information by calculating a first one time password (OTP) using a first operation key generated by combining the server authentication key a gap time value in which a time taken for the user to enter the private password is measured every 1/n seconds, wherein n is a positive real number, and a gap time key which is a numeral value extracted by criteria from the gap time value;
measuring, by the user terminal, the gap time value if the user enters the private password for authentication and transmitting, by the user terminal, the measured gap time value to the authentication server, generating, by the user terminal, a second common authentication key in real time by combining the private password with the mechanical unique key of the user terminal and encrypting the combined information, generating, by the user terminal, a user authentication key by combining the unique key of the certificate authority previously provided from the authentication server with the second common authentication key and encrypting the combined information, and generating, by the user terminal, user authentication information by calculating a second OTP using a second operation key generated by combining the user authentication key with the gap time value or the gap time key; and
performing, by the authentication server, user authentication when the server authentication information is identical to the user authentication information.

11. The method of claim 10, wherein, when a time interval from a time when an input window for inputting the private password is displayed on a screen to a time when a first digit value of the private password is entered is defined as a first time interval and when a time interval from a time when a last digit value of the private password is entered to a time when a signal of an input key or an enter key for providing notification that the input of the private password is completed is entered is defined as a second time interval, the gap time value is a time measurement value from one time selected in the first time interval to one time selected in the second time interval.

12. The method of claim 11,
wherein the user authentication key comprises an extraction value extracted by criteria from the second common authentication key and wherein the server authentication key comprises an extraction value extracted by criteria from the first common authentication key, and
wherein the second operation key for generating the user authentication information comprises an extraction value extracted by criteria from the user authentication key and the first operation key for generating the server authentication information comprises an extraction value extracted by criteria from the server authentication key.

13. The method of claim 10, wherein the first common authentication key or the second common authentication key comprises an extraction value extracted by criteria from the mechanical unique key of the user terminal or a user phone number.

14. The method of claim 13,
wherein the generating of the first common authentication key comprises:
sequentially extracting, by the user terminal, m extraction values, wherein m is a natural number, by criteria from the mechanical unique key of the user terminal when generating the first common authentication key,
generating, by the user terminal, m common authentication keys corresponding to the extraction values, and
transmitting, by the user terminal, the m common authentication keys to the authentication server,
wherein the registering of the first common authentication key comprises:
registering, by the authentication server, a common authentication key selected by criteria among the m common authentication keys as the first common authentication key, and
wherein the generating of the second common authentication key comprises:
generating, by the user terminal, the second common authentication key by selecting and including an extraction value having an order value corresponding to the first common authentication key among the m extraction values sequentially extracted by the criteria from the mechanical unique key of the user terminal.

* * * * *